US012625442B2

(12) United States Patent
Tamaki

(10) Patent No.: US 12,625,442 B2
(45) Date of Patent: May 12, 2026

(54) POWDER CONTAINER, IMAGE FORMING APPARATUS, AND METHOD FOR MANUFACTURING POWDER CONTAINER

(71) Applicant: Shuntaro Tamaki, Kanagawa (JP)

(72) Inventor: Shuntaro Tamaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/953,794

(22) Filed: Nov. 20, 2024

(65) Prior Publication Data

US 2025/0172888 A1 May 29, 2025

(30) Foreign Application Priority Data

Nov. 27, 2023 (JP) ................................ 2023-199557
Mar. 26, 2024 (JP) ................................ 2024-049040

(51) Int. Cl.
*G03G 15/08* (2006.01)
*G03G 21/16* (2006.01)

(52) U.S. Cl.
CPC ..... *G03G 15/0872* (2013.01); *G03G 15/0886* (2013.01); *G03G 21/1676* (2013.01); *G03G 2215/0869* (2013.01)

(58) Field of Classification Search
CPC ........... G03G 15/0872; G03G 15/0886; G03G 21/1676
USPC .......................................................... 399/262
See application file for complete search history.

(56) References Cited

U.S. PATENT DOCUMENTS

| | | | | |
|---|---|---|---|---|
| 7,680,444 | B2 * | 3/2010 | Kaiho | G03G 15/0886 399/262 |
| 7,869,747 | B2 * | 1/2011 | Ichikawa | G03G 15/0877 399/256 |
| 9,785,089 | B2 * | 10/2017 | Izumi | G03G 15/095 |
| 2012/0321341 | A1 | 12/2012 | Hori et al. | |
| 2013/0330105 | A1 | 12/2013 | Komatsu et al. | |
| 2015/0362861 | A1 | 12/2015 | Oshikawa et al. | |
| 2020/0033751 | A1 | 1/2020 | Matsumoto et al. | |
| 2020/0033752 | A1 | 1/2020 | Kubo et al. | |
| 2021/0033997 | A1 | 2/2021 | Kubo et al. | |
| 2021/0034007 | A1 | 2/2021 | Tamaki et al. | |

(Continued)

FOREIGN PATENT DOCUMENTS

| | | | |
|---|---|---|---|
| JP | H02-25872 | A | 1/1990 |
| JP | H06-134898 | A | 5/1994 |
| JP | 2003-341760 | A | 12/2003 |

(Continued)

OTHER PUBLICATIONS

Extended European Search Report issued Apr. 9, 2025 in European Patent Application No. 24211310.8, 12 pages.

(Continued)

*Primary Examiner* — Hoan H Tran
(74) *Attorney, Agent, or Firm* — XSENSUS LLP

(57) ABSTRACT

A powder container for storing powder inside includes a container main portion. The container main portion has a substantially cylindrical shape to rotate around a rotation axis of the container main portion to convey powder stored inside the container main portion in a conveyance direction along a direction of the rotation axis. The container main portion is a component made of paper formed by press working.

20 Claims, 6 Drawing Sheets

(56) References Cited

U.S. PATENT DOCUMENTS

| | | | |
|---|---|---|---|
| 2022/0397841 | A1 | 12/2022 | Tsuchiya et al. |

FOREIGN PATENT DOCUMENTS

| | | | |
|---|---|---|---|
| JP | 2004361545 | * | 12/2004 |
| JP | 2005-258136 | A | 9/2005 |
| JP | 2009-286488 | A | 12/2009 |
| JP | 2013-254170 | A | 12/2013 |
| JP | 2015-129913 | A | 7/2015 |
| JP | 2022-090641 | A | 6/2022 |

OTHER PUBLICATIONS

Anonymous, "Papermaking—Wikipedia", Oct. 29, 2023, 7 pages, XP093262971.

Joost Langeveld, "Joost Langeveld Origami Page", Mar. 25, 2025, 5 pages, XP093263059.

Anonymous, "Blow molding—Wikipedia", Mar. 19, 2022, 5 pages, XP093263171.

* cited by examiner

POWDER CONTAINER, IMAGE FORMING APPARATUS, AND METHOD FOR MANUFACTURING POWDER CONTAINER

CROSS-REFERENCE TO RELATED APPLICATIONS

This patent application is based on and claims priority pursuant to 35 U.S.C. § 119(a) to Japanese Patent Application Nos. 2023-199557, filed on Nov. 27, 2023, and 2024-049040, filed on Mar. 26, 2024 in the Japan Patent Office, the entire disclosure of which is hereby incorporated by reference herein.

BACKGROUND

Technical Field

Embodiments of the present disclosure relate to a powder container in which powder such as toner is stored therein, an image forming apparatus such as a copier, a printer, a facsimile, or a multifunction peripheral thereof including the powder container, and a method for manufacturing the powder container.

Related Art

Image forming apparatuses such as copiers and printers are widely known in which a substantially cylindrical toner container attached to and detached from a body of an image forming apparatus is disposed. Specifically, the toner container typically includes a substantially cylindrical container body and a cap. The container body has an opening portion in a head portion and a spiral projection formed on an inner circumferential surface of the container body. The cap has a toner ejection port (supplying port) at its bottom portion, and the head portion of the container body is inserted therein.

SUMMARY

In an embodiment of the present disclosure, a powder container for storing powder inside includes a container main portion. The container main portion has a substantially cylindrical shape to rotate around a rotation axis of the container main portion to convey powder stored inside the container main portion in a conveyance direction along a direction of the rotation axis. The container main portion is a component made of paper formed by press working.

In another embodiment of the present disclosure, an image forming apparatus includes a body and the powder container detachably attached to the body.

In still another embodiment of the present disclosure, a method of manufacturing a powder container for storing powder inside includes performing press working on a flat sheet of paper to form a plurality of concave-and-convex portions that are recessed from a front surface of the flat sheet of paper and protrude toward a back surface of the flat sheet of paper and joining ends of the flat sheet of paper to form a container main portion having a substantially cylindrical shape after the pressing working.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
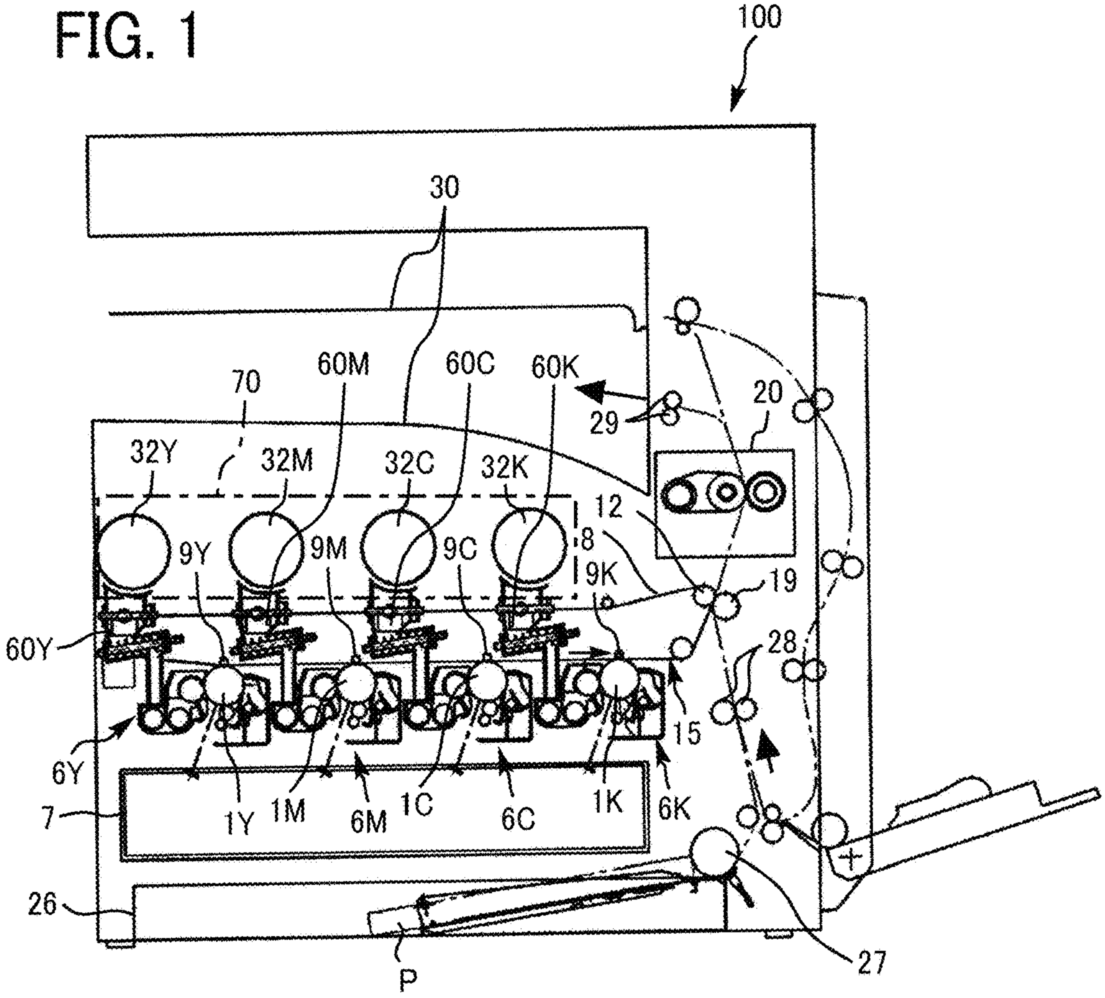
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Embodiments of the present disclosure are described below in detail with reference to the drawings. Like reference signs are assigned to like elements or components and descriptions of those elements or components may be simplified or omitted. As used herein, the singular forms "a," "an," and "the" are intended to include the plural forms as well, unless the context clearly indicates otherwise.

A configuration and operation of an image forming apparatus 100 is described below. As illustrated in FIG. 1, four toner containers 32Y, 32M, 32C, and 32K corresponding to colors of yellow, magenta, cyan, and black, respectively, are detachably (i.e., replaceably) arranged in a toner container housing 70 (see FIG. 4) in an upper area of a body of the image forming apparatus 100. The toner containers 32Y, 32M, 32C, and 32K are manually attached to and detached from the body of the image forming apparatus 100 by an operator such as a user. An intermediate transfer unit 15 is disposed below the toner container housing 70. Image forming devices 6Y, 6M, 6C, and 6K corresponding to colors of yellow, magenta, cyan, and black, respectively, are arranged side by side to face an intermediate transfer belt 8 of the intermediate transfer unit 15. Toner supply devices 60Y, 60M, 60C, and 60K are disposed below the toner containers 32Y, 32M, 32C, and 32K, respectively. Toner stored in the toner containers 32Y, 32M, 32C, and 32K is supplied (replenished) by the toner supply devices 60Y, 60M, 60C, and 60K into developing devices of the image forming devices 6Y, 6M, 6C, and 6K, respectively.

Figure 2:
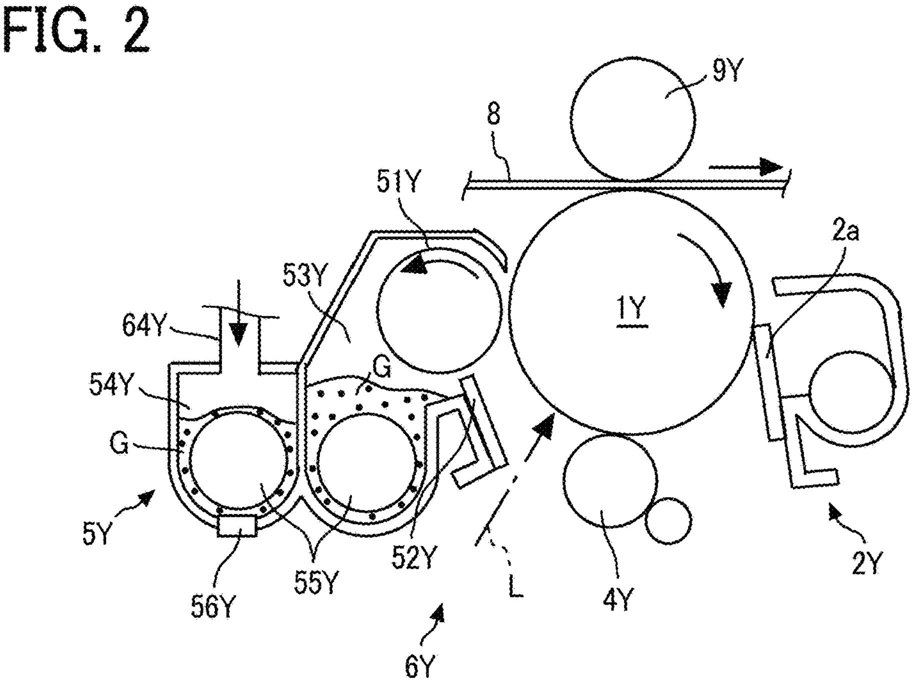
FIG. 2 is a cross-sectional view of an image forming device included in the image forming apparatus of FIG. 1.

With reference to FIG. 2, the image forming device 6Y for yellow includes a photoconductor drum 1Y, a charging device 4Y, a developing device 5Y, a cleaning device 2Y, and an electric-charge removing device disposed around the photoconductor drum 1Y Image forming processes (i.e., a charging process, an exposure process, a development process, a transfer process, a cleaning process, and an electric-charge removing process) are executed on the photoconductor drum 1Y. Thus, a yellow toner image is formed on the surface of the photoconductor drum 1Y.

The other three image forming devices 6M, 6C, and 6K have substantially the same configuration as that of the image forming device 6Y for yellow except for the color of toner used therein and form magenta, cyan, and black toner images, respectively. Only the image forming unit 6Y is described below and descriptions of the other three image forming units 6M, 6C, and 6K are appropriately omitted.

As illustrated in FIG. 2, a drive motor drives to rotate the photoconductor drum 1Y in a clockwise direction. The charging device 4Y uniformly charges the surface of the photoconductor drum 1Y (charging process). When the surface of the photoconductor drum 1Y reaches a position at which the surface of the photoconductor drum 1Y is irradiated with a laser beam L emitted from an exposure device 7 (see FIG. 1), the photoconductor drum 1Y is scanned with the laser beam L at the position. Thus, an electrostatic latent image corresponding to yellow is formed on the photoconductor drum 1Y (exposure process).

When the surface of the photoconductor drum 1Y reaches a position facing the developing device 5Y, the electrostatic latent image is developed with toner into a yellow toner image (development process). When the surface of the photoconductor drum 1Y bearing the toner image reaches a position facing a primary transfer roller 9Y via the intermediate transfer belt 8, at the position, the toner image on the photoconductor drum 1Y is transferred onto the intermediate transfer belt 8 (primary transfer process). After the primary transfer process, a slight amount of untransferred toner remains on the photoconductor drum 1Y.

When the surface of the photoconductor drum 1Y reaches a position opposite the cleaning device 2Y, a cleaning blade 2*a* of the cleaning device 2Y mechanically collects the untransferred toner on the photoconductor drum 1Y (cleaning process). Finally, the surface of the photoconductor drum 1Y reaches a position facing the electric-charge removing device, and residual potential on the photoconductor drum 1Y is removed at this position (electric-charge removing process). Thus, a series of image forming processes executed on the surface of the photoconductor drum 1Y is completed.

The other image forming devices 6M, 6C, and 6K perform the series of image forming processes described above in substantially the same manner as the image forming device 6Y for yellow. In other words, the exposure device 7 disposed below the image forming devices 6M, 6C, and 6K irradiates photoconductor drums 1M, 1C, and 1K of the image forming devices 6M, 6C, and 6K, respectively, with the laser beams L based on image data. Then, toner images formed on the photoconductor drums 1Y, 1M, 1C, and 1K through the development step are transferred and superimposed onto the intermediate transfer belt 8. Thus, a color toner image is formed on the intermediate transfer belt 8.

With reference to FIG. 1, the intermediate transfer unit 15 includes the intermediate transfer belt 8, the four primary transfer rollers 9Y, 9M, 9C, and 9K, a secondary-transfer counter roller 12, tension rollers, and an intermediate-transfer-belt cleaner. The intermediate transfer belt 8 is stretched around and supported by multiple rollers and is rotated in the direction indicated by arrow illustrated in FIG. 1 as one of the multiple rollers that serves as a drive roller rotates (i.e., the secondary-transfer counter roller 12).

The four primary transfer rollers 9Y, 9M, 9C, and 9K are pressed against the corresponding photoconductor drums 1Y, 1M, 1C, and 1K, respectively, via the intermediate transfer belt 8 to form primary transfer nips. A primary transfer bias opposite in polarity to toner is applied to the primary transfer rollers 9Y, 9M, 9C, and 9K. The intermediate transfer belt 8 travels in the direction (counterclockwise) indicated by an arrow in FIG. 1 and sequentially passes through the primary transfer nips of the four primary transfer rollers 9Y, 9M, 9C, and 9K. As a result, the single-color toner images on the photoconductor drums 1Y, 1M, 1C, and 1K, having the respective colors, are primarily transferred and superimposed onto the intermediate transfer belt 8, thereby forming the multicolor toner image (primary transfer process).

Subsequently, the intermediate transfer belt 8 onto which the toner images of the respective colors are transferred and superimposed reaches a position opposite a secondary transfer roller 19. At this position, the intermediate transfer belt 8 is nipped between the secondary-transfer counter roller 12 and the secondary transfer roller 19 to form a secondary transfer nip. The toner images of four colors formed on the intermediate transfer belt 8 are transferred onto a sheet P such as a sheet of paper conveyed to the position of the secondary transfer nip (secondary transfer process). At this time, the untransferred toner that has not been transferred onto the sheet P remains on the surface of the intermediate transfer belt 8. The surface of the intermediate transfer belt 8 then reaches a position opposite the intermediate-transfer-belt cleaner. At the position, the intermediate-transfer-belt cleaner collects the untransferred toner from the surface of the intermediate transfer belt 8. Thus, a series of transfer processes performed on the intermediate transfer belt 8 ends.

The sheet P is conveyed from a sheet feeder 26 disposed in a lower portion of the body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between rollers of the registration roller pair 28.

The sheet P conveyed to the registration roller pair 28 temporarily stops at a position of the roller nip between the rollers of the registration roller pair 28 that has stopped rotating. The registration roller pair 28 is rotated at a timing at which the sheet P meets the color toner image on the intermediate transfer belt 8 at the secondary transfer nip, to convey the sheet P toward the secondary transfer nip. Thus, the desired color image is transferred onto the sheet P.

Subsequently, the sheet P, onto which the color toner image is transferred at the secondary transfer nip, is conveyed to a position of a fixing device 20. Then, at this position, the color toner image transferred to the surface of the sheet P is fixed on the sheet P by heat and pressure of a fixing belt and a pressing roller. Subsequently, the sheet P is conveyed through the rollers of an output roller pair 29 and ejected to the outside of the image forming apparatus 100. The sheets P ejected by the output roller pair 29 to the outside of the image forming apparatus 100 are sequentially stacked as output images on a stack tray 30. Thus, a series of image forming processes performed by the image forming apparatus 100 is completed.

A detailed description is provided of a configuration and operation of the developing device 5Y of the image forming device 6Y with reference to FIG. 2. The developing device 5Y includes a developing roller 51Y disposed opposite the photoconductor drum 1Y, a doctor blade 52Y disposed opposite the developing roller 51Y, two conveying screws 55Y disposed in developer housings 53Y and 54Y, and a toner concentration sensor 56Y to detect concentration of toner in developer G. The developing roller 51Y includes a magnet and a sleeve. The magnet is fixed inside the developing roller 51Y. The sleeve rotates around the magnet. The developer housings 53Y and 54Y contain the two-component developer G including carrier (i.e., carrier particles) and toner (i.e., toner particles). The developer housing 54Y communicates, via an opening on an upper side thereof, with a downward toner conveyance passage 64Y.

The developing device 5Y described above operates as follows. The sleeve of the developing roller 51Y rotates in a direction indicated by an arrow in FIG. 2. The developer G is carried on the developing roller 51Y by a magnetic field generated by the magnet. As the sleeve rotates, the developer G moves along the outer circumferential surface of the developing roller 51Y.

The developer G in the developing device 5Y is adjusted so that the ratio of toner (toner concentration) in the developer G is within a specified range. More specifically, the toner supply device 60Y (see FIG. 3) supplies toner (as powder) from the toner container 32Y to the developer housing 54Y according to the toner consumption in the developing device 5Y. The configuration and operation of the toner supply device are described in detail below.

The two conveying screws 55Y mix and stir the developer G with the toner supplied to the developer housing 54Y while circulating with the developer G in the two developer housings 53Y and 54Y. In this case, the developer G moves in the direction perpendicular to the surface of the plane on which FIG. 2 is illustrated. The toner in the developer G is electrically charged by friction with the carrier, so that the toner is attracted to the carrier. Both the toner and the carrier are borne on the developing roller 51Y due to a magnetic force generated on the developing roller 51Y.

The developer G borne on the developing roller 51Y is conveyed in the direction indicated by arrow in FIG. 2 and reaches a position opposite the doctor blade 52Y. At this position, the doctor blade 52Y adjusts the amount of the developer G on the developing roller 51Y to an appropriate amount. Thereafter, the developer G on the developing roller 51Y is conveyed to a position opposite the photoconductor drum 1Y (i.e., which is a development area). The toner is attracted to the electrostatic latent image formed on the photoconductor drum 1Y by an electric field generated in the developing area. As the sleeve rotates, the developer G remaining on the developing roller 51Y reaches an upper part of the developer housing 53Y and separates from the developing roller 51Y.

Figure 3:
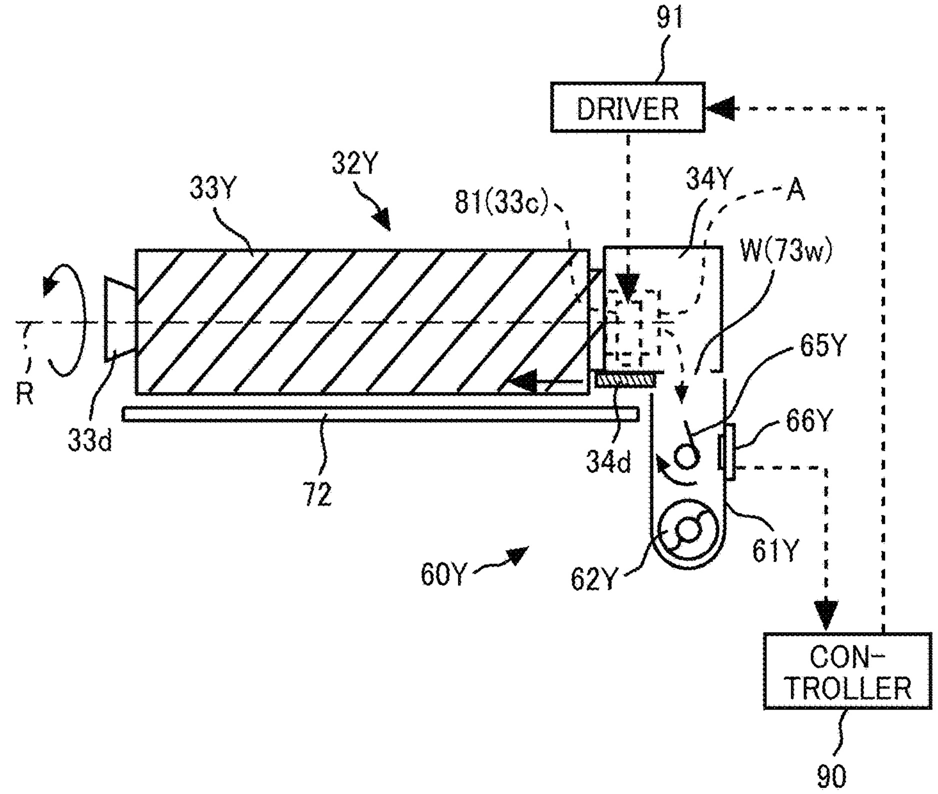
FIG. 3 is a view of a toner container disposed in a toner supply device.
Figure 4:
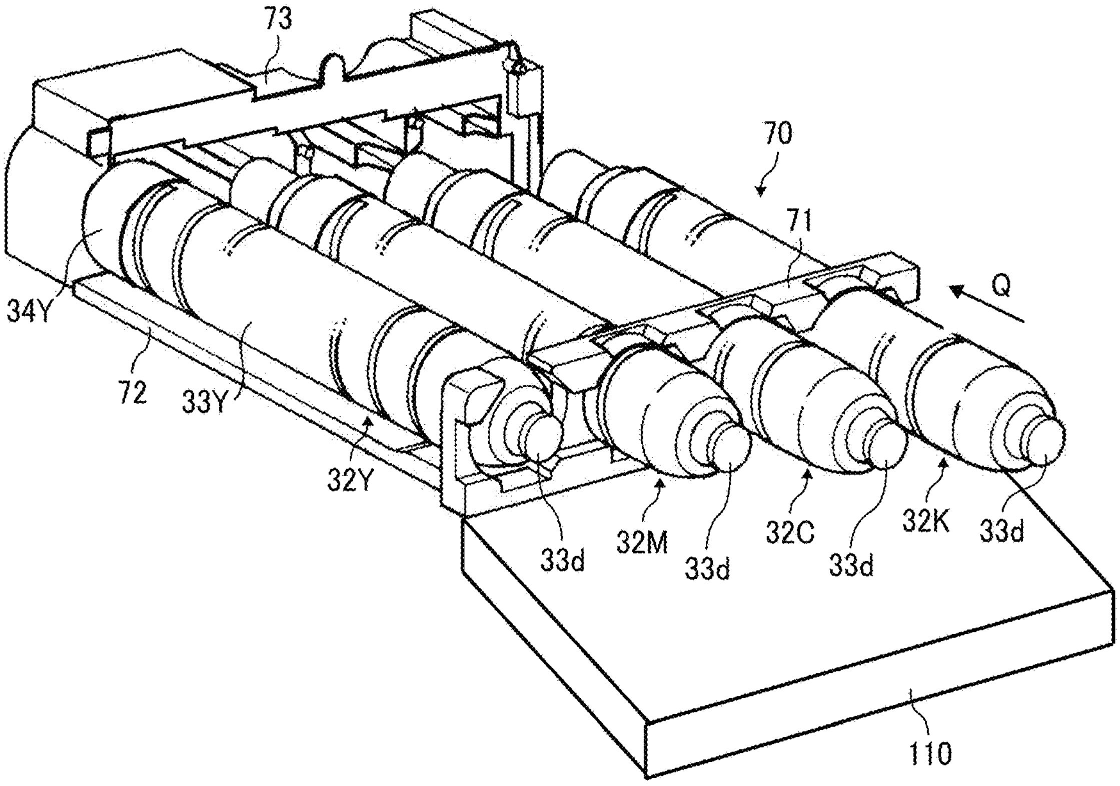
FIG. 4 is a perspective view of toner containers disposed on a mount.

With reference to FIGS. 3 and 4, the toner supply devices 60Y, 60M, 60C, and 60K are described in detail below. As illustrated in FIG. 3, the respective color toners in the toner containers 32Y, 32M, 32C, and 32K disposed in the toner container housing 70 in the body of the image forming apparatus 100 are supplied to the corresponding developing devices by the toner supply devices 60Y, 60M, 60C, and 60K provided for the respective color toners according to the amount of toner consumed in the corresponding developing devices. It is to be noted that the four toner supply devices 60Y, 60M, 60C, and 60K have a similar structure, and the four toner containers 32Y, 32M, 32C, and 32K have a similar structure except for the color of toner used in the image forming processes. Therefore, only the toner supply device 60Y and the toner container 32Y for yellow are described below as representatives, and descriptions of the toner supply devices 60M, 60C, and 60K and the toner containers 32M, 32C, and 32K for the other three colors are omitted to avoid redundancy.

As illustrated in FIG. 4, when the toner containers 32Y, 32M, 32C, and 32K are attached (moved in the direction of arrow Q) to the toner container housing 70 (provided with a rail 72 as a mount) of the body of the image forming apparatus 100, shutters 34*d* of the toner containers 32Y, 32M, 32C, and 32K move in conjunction with an attachment operation to open a toner ejection port W as an ejection port, and toner supply ports 73*w* (see FIG. 3) of the toner supply devices 60Y, 60M, 60C, and 60K and the toner ejection port W communicate with each other. Accordingly, the toner stored in the toner containers 32Y, 32M, 32C, and 32K is ejected from the toner ejection ports W, passes through the toner supply ports 73*w* of the toner supply devices 60Y, 60M, 60C, and 60K, and then, is stored in toner tanks 61Y, 61M, 61C, and 61K of the toner supply device 60Y, 60M, 60C, and 60K. With reference to FIG. 3, the toner container 32Y is a substantially cylindrical toner bottle and typically includes a cap 34Y and a container body 33Y (i.e., a bottle body) formed together with a gear 33*c* (see FIG. 6). The cap 34Y is held by the toner container housing 70 not to rotate. The container body 33Y is held so as to be rotatable relative to the cap 34Y and is rotated by a driver 91 (including a drive motor and a drive gear 81) in the direction indicated by an arrow illustrated in FIG. 3. As the container body 33Y itself rotates, the toner stored in the toner container 32Y (container body 33Y) is conveyed in the longitudinal direction (from left to right in FIG. 3) by a spiral concave-and-convex portion 33*b* (projection) that is recessed from the outer circumferential surface side of the container body 33Y and protrudes toward the inner circumferential surface, and the toner is ejected from the toner ejection port W of the cap 34Y. In other words, the driver 91 drives to rotate the container body 33Y of the toner container 32Y as required, thereby supplying the toner to the toner tank 61Y. The toner containers 32Y, 32M, 32C, and 32K are replaced with new ones when the respective service lives thereof have expired, that is, when almost all toner stored in the respective toner containers 32 has been depleted.

With reference to FIG. 3, the toner supply device 60Y include the toner container housing 70, the toner tank 61Y, a toner conveying screw 62Y, a stirring member 65Y, a toner end sensor 66Y, and the driver 91. The toner tank 61Y is disposed below the toner ejection port W of the toner container 32Y to store the toner ejected through the toner ejection port W of the toner container 32Y. A bottom portion of the toner tank 61Y is coupled to an upstream portion of the toner conveying screw 62Y in the direction in which the toner is conveyed. The toner end sensor 66Y is disposed on a wall face of the toner tank 61Y at a specified height from the bottom portion and detects that the amount of toner stored in the toner tank 61Y has fallen to a specified amount or less. For example, a piezoelectric sensor can be used as the toner end sensor 66Y. When a controller 90 detects that the amount of toner stored in the toner tank 61Y is a predetermined amount or less by the toner end sensor 66Y, the controller 90 controls the driver 91 (e.g., the drive gear 81) to rotate the container body 33Y of the toner container 32Y for a specified time, and to supply toner to the toner tank 61Y. If the toner end sensor 66Y continues to detect "toner end" even when this operation is repeated for a specified number of times, the controller 90 controls to display that the toner container 32Y is empty (toner depletion) on a display panel of the body of the image forming apparatus 100 to prompt a user to replace the toner container 32Y.

The stirring member 65Y is disposed at the center of the toner tank 61Y (near the toner end sensor 66Y) to prevent agglomeration of the toner stored in the toner tank 61Y. The stirring member 65Y includes a shaft and a flexible member disposed on the shaft. The stirring member 65Y rotates clockwise in FIG. 3 to stir the toner in the toner tank 61Y. The tip of the flexible member of the stirring member 65Y slidingly contacts a surface where the toner end sensor 66Y detects in rotation cycles. As a result, the toner does not adhere to the surface detected by the toner end sensor 66Y, thereby preventing the detection accuracy from deteriorating.

The toner conveying screw 62Y conveys the toner stored in the toner tank 61Y obliquely upward. Specifically, the toner conveying screw 62Y conveys the toner linearly from the bottom portion (i.e., bottom point) of the toner tank 61Y toward the upper side of the developing device 5Y. Then, the toner thus conveyed by the toner conveying screw 62Y falls through the downward toner conveyance passage 64Y (see FIG. 2) by its own weight and is supplied to the developing device 5Y (the developer housing 54Y).

With reference to FIG. 4, the toner container housing 70 typically includes a cap receiving portion 73 for holding the cap 34Y of the toner container 32Y, the rail 72 as a mount (an installation portion) for holding the container body 33Y of the toner container 32Y, and an insertion port 71 as an insertion port through which the toner container 32Y is attached.

With reference to FIG. 1, when an opening-and-closing door 110 (see FIG. 4) disposed on the front side of the body of the image forming apparatus 100 (i.e., which is on the front side in the direction perpendicular to the surface of the plane on which FIG. 1 is illustrated) is opened, the toner container housing 70 (e.g., the insertion port 71 and the rail 72) is exposed. The toner containers 32Y, 32M, 32C, and 32K are attached to and detached from the front upper side of the body of the image forming apparatus 100 with the longitudinal direction (a rotation axis direction) of the toner containers 32Y, 32M, 32C, and 32K kept horizontal. In other words, an attachment-and-detachment operation of the toner containers 32Y, 32M, 32C, and 32K is performed with the longitudinal direction (the rotation axis direction) of the toner containers 32Y, 32M, 32C, and 32K as an attachment-and-detachment direction. The rail 72 (serving as a mount) is formed so that the longitudinal length is almost equal to (or slightly longer than) the longitudinal length of the container body 33Y. The cap receiving portion 73 is disposed on one end (downstream end in the attachment direction) of the rail 72 in the longitudinal direction, and the insertion port 71 is disposed on the other end (upstream end in the attachment direction) of the rail 72 in the longitudinal direction. Accordingly, in the attachment operation of the toner container 32Y into the toner container housing 70, the cap 34Y passes through the insertion port 71, slides on the rail 72 over a certain distance, and is then attached to the cap receiving portion 73.

Figure 5:
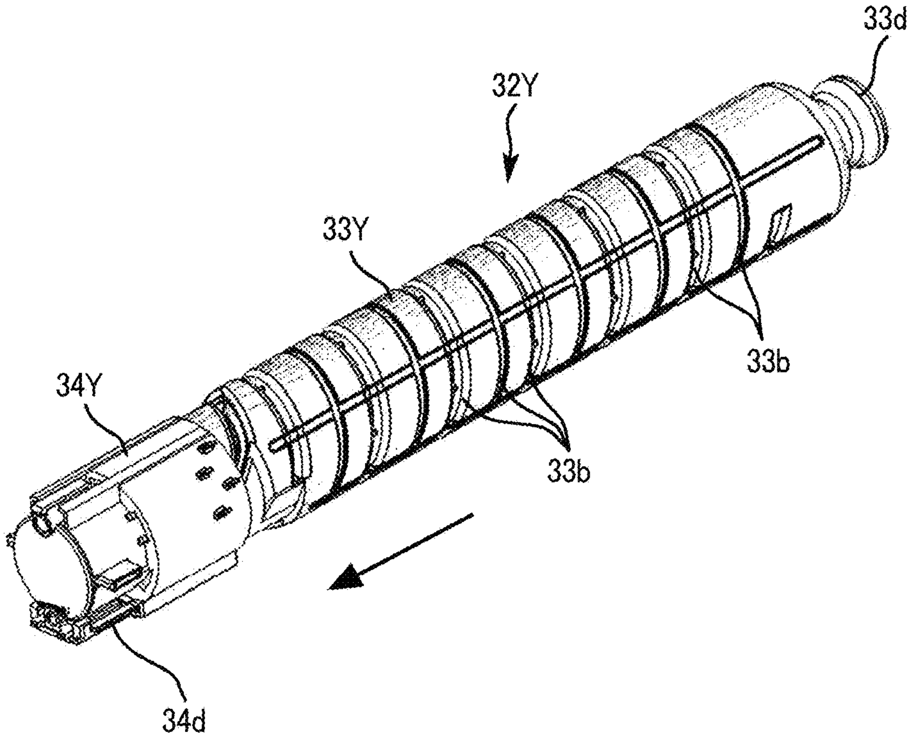
FIG. 5 is a perspective view of a toner container.

With reference to FIG. 5, the toner containers 32Y, 32M, 32C, and 32K as powder containers are described in detail. As illustrated in FIG. 5, the toner container 32Y typically includes a substantially cylindrical container body 33Y (bottle body) and the cap 34Y (bottle cap) into which a head portion (which is a container head portion 33Y2, see FIG. 6) of the container body 33Y is inserted. The substantially cylindrical container body 33Y rotates around a rotation axis R (see FIG. 3) with the rotation axis direction being a direction in which the toner container 32Y is attached and detached (a left-and-right direction in FIG. 3), to convey toner (powder) stored therein toward an opening portion A. In the cap 34Y, the head portion of the container body 33Y (the container head portion 33Y2) in which the opening portion A is formed is inserted, and the toner ejection port W for ejecting the toner ejected from the opening portion A to the outside of the container body 33Y is disposed in a bottom portion of the cap 34Y.

Figure 6:
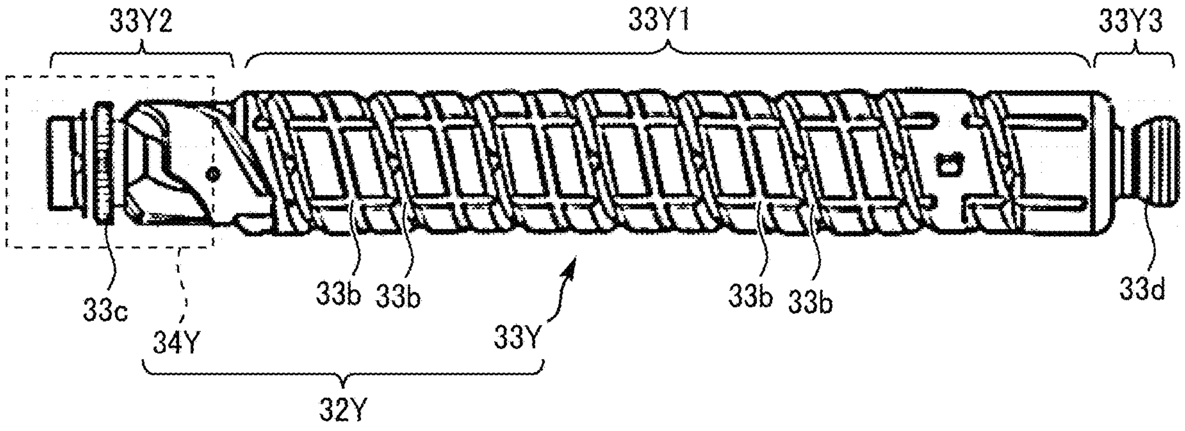
FIG. 6 is a side view of a container main portion (a container body) of a toner container.

With reference to FIGS. 2 and 6, in the container head portion 33Y2 of the substantially cylindrical container body 33Y, the gear 33*c* that rotates integrally with the container body 33Y, and the opening portion A are disposed on one end in the rotation axis direction (left-and-right direction of FIGS. 2 and 6). The opening portion A is formed on the container head portion 33Y2 of the container body 33Y (i.e., a leading position when the toner container 32Y is inserted into the toner container housing 70). The toner stored in the container body 33Y is ejected through the opening portion A to a space (a cavity) inside the cap 34Y. The conveyance of toner from the inside of the container body 33Y to the cavity in the cap 34Y (i.e., rotational drive by the container body 33Y) is appropriately performed so that the toner in the cap 34Y does not go below a specified waterline.

The gear 33*c* of the container body 33Y (the container head portion 33Y2) meshes with the drive gear 81 disposed in the toner container housing 70 of the body of the image forming apparatus 100 to rotate the container body 33Y in the direction indicated by the arrow in FIG. 2 with the longitudinal direction as the rotation axis direction. Specifically, the gear 33*c* is formed to go around the opening portion A, and a plurality of teeth are formed radially with respect to the rotation center of the container body 33Y. A part of the gear 33*c* is exposed from a notch (see FIG. 6) formed in the cap 34Y, and the gear 33*c* meshes with the drive gear 81 of the body of the image forming apparatus 100 at a meshing position located obliquely below the gear 33*c*. A driving force is transmitted from the drive gear 81 to the gear 33*c*, and the container body 33Y rotates in a specified direction.

With reference to FIGS. 4 to 6, a grip 33*d* gripped when a user attaches and detaches the toner container 32Y is disposed on a container bottom portion 33Y3 on the other end of the container body 33Y in the longitudinal direction (i.e., on the rear end in the attachment direction). The user grips the grip 33*d* to attach the toner container 32Y to the body of the image forming apparatus 100 (the rail 72), which is a movement of the toner container 32Y in the direction indicated by the arrow illustrated in FIG. 5.

A container main portion 33Y1 of the container body 33Y, which is a portion different from the container head portion 33Y2 and the container bottom portion 33Y3, has the spiral concave-and-convex portion 33*b* that is recessed from the outer circumferential surface and protrudes toward the inner circumferential surface. The spiral concave-and-convex portion 33*b* is a portion forming a spiral groove when viewed from the outer circumferential surface and forming a spiral projection when viewed from the inner circumferential surface (see FIGS. 5 and 6). The spiral concave-and-convex portion 33*b* ejects toner stored in the container body 33Y through the opening portion A. When the container body 33Y rotates around the rotation axis R with the longitudinal direction as the rotation axis direction, the spiral concave-and-convex portion 33*b* conveys the toner toward the opening portion A and ejects the toner from the opening portion A. In the present embodiment, the container main portion 33Y1 of the container body 33Y is formed of press-workable forming paper, which is described later in detail with reference to FIGS. 6, 7, 8, and 9A to 9D.

With reference to FIGS. 3, 5, and 6, the cap 34Y of the toner container 32Y has, for example, the shutter 34*d* on the bottom portion thereof. The opening portion A of the container body 33Y is inserted into the cap 34Y. In the bottom portion of the cap 34Y, the toner ejection port W (ejection port) is formed for ejecting (falling by its own weight) the toner ejected from the opening portion A of the container body 33Y vertically downward and outside the container body 33Y. The shutter 34*d* (see FIGS. 3 and 5) for opening and closing the toner ejection port W is held in a slidable manner in the bottom portion of the cap 34Y Specifically, the shutter 34*d* opens the toner ejection port W by a relative movement in the longitudinal direction (i.e., a movement in the direction opposite to the direction indicated by the arrow in FIG. 5) from the cap 34Y toward the container body 33Y. The shutter 34*d* closes the toner ejection port W by a relative movement in the longitudinal direction (i.e., a movement in the direction indicated by the arrow in FIG. 5) from the container body 33Y toward the cap 34Y. The opening-and-closing operation of the shutter 34*d* (opening-and-closing operation of the toner ejection port W) is performed in conjunction with the attachment-and-detachment operation of the toner container 32Y to and from the toner container housing 70 (the rail 72) in the longitudinal direction (the rotation axis direction).

The cap 34Y having such a configuration communicates with the container body 33Y via the opening portion A, and the toner ejected from the opening portion A is ejected through the toner ejection port W (i.e., moves in the direction indicated by broken arrow illustrated in FIG. 3). In the present embodiment, a substantially cylindrical cavity (space) is formed inside the cap 34Y to extend in the longitudinal direction. In addition, a cylindrical toner dropping path having a fixed channel area (cross-sectional channel area) extends from a lower circumferential face of the substantially columnar cavity to the toner ejection port W in the cap 34Y With this configuration, the toner ejected from the opening portion A of the container body 33Y to the cavity in the cap 34Y smoothly drops through the toner ejection port W outside the container (the toner tank 61Y) by its own weight.

A description is given below of a configuration and an operation of the toner container 32Y (32M, 32C, 32K) according to the present embodiment. As described above with reference to FIGS. 5 and 6, the toner container 32Y in the present embodiment that can contain toner as powder inside includes the container body 33Y and the cap 34Y As illustrated in FIG. 6, the container body 33Y typically includes the substantially cylindrical container main portion 33Y1, the container head portion 33Y2 disposed on one end (left in FIG. 6) of the container main portion 33Y1 in the rotation axis direction, and the container bottom portion 33Y3 disposed on the other end (right in FIG. 6) of the container main portion 33Y1 in the rotation axis direction.

The container main portion 33Y1 has a substantially cylindrical shape and is rotated around the rotation axis R (see FIG. 3) to convey toner (powder) stored therein with the rotation axis direction as the conveyance direction of the toner. Specifically, the container main portion 33Y1 has a plurality of concave-and-convex portions 33*b* that are recessed from the outer circumferential surface having the substantially cylindrical shape and protrude toward the inner circumferential surface. A plurality of concave-and-convex portions 33*b* are formed in a spiral shape at intervals N (see FIG. 7) in a spiral direction. The container main portion 33Y1 is rotated to convey the toner stored inside in the rotation axis direction. The container main portion 33Y1 is open at both ends in the rotation axis direction. The container head portion 33Y2 is disposed to communicate with an opening of the container main portion 33Y1 on the downstream side (left side in FIG. 6) in the conveyance direction. The container head portion 33Y2 has an opening portion A (see FIG. 3) as an ejection port for ejecting toner (powder) conveyed from the container main portion 33Y1 to the outside of the container main portion 33Y1 through the cap 34Y and has the gear 33*c* on the outer circumferential surface. The container head portion 33Y2 is bonded to the container main portion 33Y1 by an adhesive and is rotatable together with the container main portion 33Y1. The container bottom portion 33Y3 is disposed to close an opening of the container main portion 33Y1 on the upstream side (right side in FIG. 6) in the conveyance direction. The container bottom portion 33Y3 is bonded to the container main portion 33Y1 by an adhesive and is rotatable together with the container main portion 33Y1.

With reference to FIGS. 7, 8, and 9A to 9D, in the present embodiment, the container main portion 33Y1 is formed by press working of forming paper such as a pulp mold. In other words, the container main portion 33Y1 is formed by press working of forming paper as a paper. In detail, the container main portion 33Y1 is not formed of general paper that is likely to be broken or cracked during forming and is formed of forming paper that can be formed by press working. Specifically, the container main portion 33Y1 is manufactured by press working of a flat sheet of forming paper (a rectangular sheet of forming paper having a thickness of t mm and a dimension of E mm×D mm). The above-described dimension E mm is a dimension of the container main portion 33Y1 in the rotation axis direction, the dimension D is a dimension substantially equal to the circumference of the container main portion 33Y1, and the dimension t is a thickness of the container main portion 33Y1. In the present embodiment, the thickness (paper thickness) of forming paper (paper) is preferably in the range of 0.5 to 2 mm.

Figure 7:
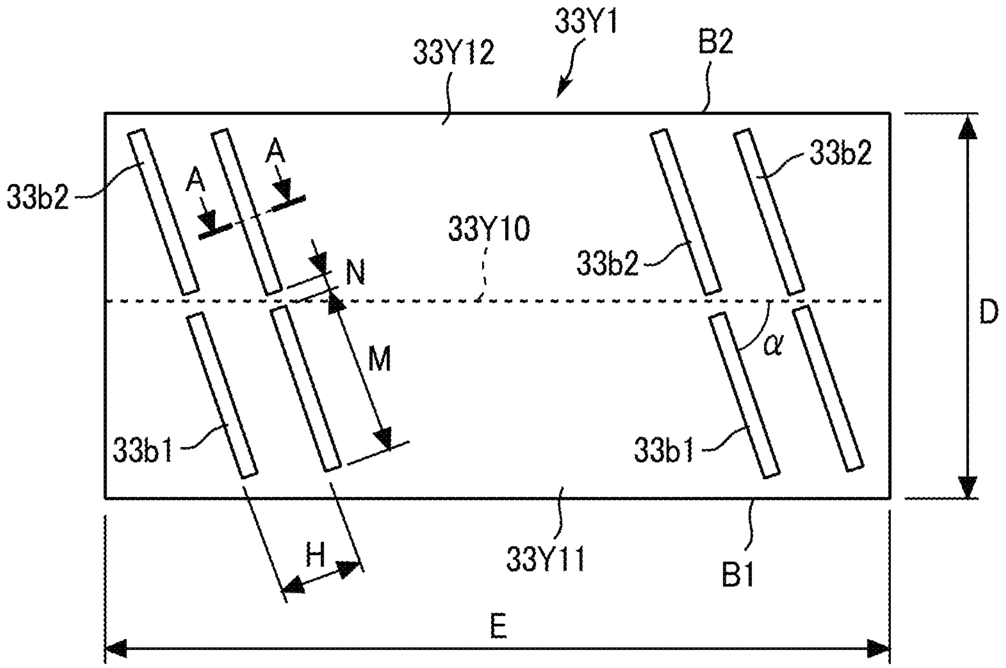
FIG. 7 is a plan view of a flat sheet of forming paper before formation of a substantially cylindrical container main portion.

The container main portion 33Y1 has a plurality of concave-and-convex portions 33*b* (33*b*1 and 33*b*2) formed by press working. Each of the concave-and-convex portions 33*b* is recessed from the outer circumferential surface (corresponding to a front surface 33Ya illustrated in FIG. 8) having a substantially cylindrical shape and protrudes by Y mm to the inner circumferential surface (corresponding to a back surface 33Yb side illustrated in FIG. 8). The plurality of concave-and-convex portions 33*b* (33*b*1 and 33*b*2) are spirally arranged (spirally formed at intervals N in the spiral direction) on the substantially cylindrical container main portion 33Y1. The container body 33Y (the container main portion 33Y1) is rotated so that the toner stored therein is conveyed in the rotation axis direction by the concave-and-convex portion 33*b*. In FIG. 7, for the sake of simplicity, only the concave-and-convex portions 33*b*1 and 33*b*2 formed at both ends of the flat sheet of forming paper (container main portion 33Y1) are illustrated, and the concave-and-convex portions 33*b*1 and 33*b*2 formed at the center of the flat sheet of forming paper are not illustrated. However, the plurality of concave-and-convex portions 33*b*1 and 33*b*2 are arranged at substantially same intervals in the rotation axis direction (the left-and-right direction in FIG. 7). FIG. 7 (and FIG. 10 to be described later) is a view of the container main portion 33Y1 having a flat sheet shape before being formed into a cylindrical shape. However, the concave-and-convex portions 33*b*1 and 33*b*2 are illustrated in order to facilitate understanding of the positions of the concave-and-convex portions 33*b*1 and 33*b*2 after press working. Each of the plurality of concave-and-convex portions 33*b* (33*b*1 and 33*b*2) in the present embodiment is a spiral of a half or less of the circumference of the container main portion 33Y1. In other words, the plurality of concave-and-convex portions 33*b* (33*b*1 and 33*b*2) do not form one continuous spiral. Each of the concave-and-convex portions 33*b* (33*b*1 and 33*b*2) is disconnected and forms a spiral independently. In the present specification, the plurality of concave-and-convex portions 33*b* (33*b*1 and 33*b*2) formed in this way are also defined as being formed in a spiral shape.

Figure 8:
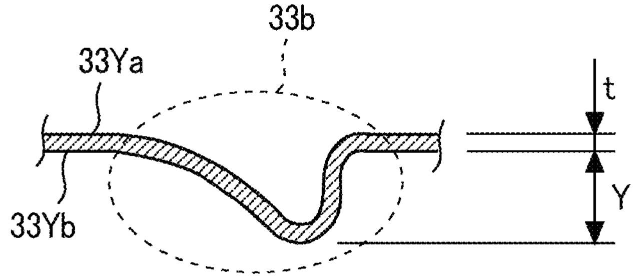
FIG. 8 is a cross-sectional view of a concave-and-convex portion, taken along line A-A of FIG. 7.

As described above, in the present embodiment, the container main portion 33Y1 (toner container 32Y) is manufactured through the following steps. First, as illustrated in FIGS. 7 and 8, a "pressing step" is performed in which press working is performed on a flat sheet of forming paper (paper) to form a plurality of concave-and-convex portions 33*b* that are recessed from the front surface 33Ya and protrude toward the back surface 33Yb. In other words, the flat sheet of forming paper (paper) is set in a die and press working is performed to form the plurality of concave-and-convex portions 33*b* (33*b*1 and 33*b*2) on the forming paper. After the press-working step, a "joining step" is performed of joining ends B1 and B2 of the forming paper (paper) on which the concave-and-convex portions 33*b* (33*b*1 and 33*b*2) are formed to form the substantially cylindrical container main portion 33Y1. In order to easily perform the above-described joining step, as illustrated in FIG. 7, the concave-and-convex portions 33*b*1 and 33*b*2 are not coupled to each other in a direction (in a circumferential direction) orthogonal to the rotation axis direction, but are divided with a space between the concave-and-convex portion 33*b*1 on the lower portion in FIG. 7 and the concave-and-convex portion 33*b*2 on the upper portion in FIG. 7. After the joining step, the container head portion 33Y2 is joined to the head portion of the container main portion 33Y1 by an adhesive, and the container bottom portion 33Y3 is joined to the bottom portion of the container main portion 33Y1 by an adhesive. Thus, the manufacturing of the container body 33Y is completed (see FIG. 6). Thereafter, toner is filled into the container body 33Y illustrated in FIG. 6, and the cap 34Y is attached to the container head portion 33Y2 of the container body 33Y. Thus, the manufacturing of the toner container 32Y is completed (see FIG. 5).

In the present embodiment, the container head portion 33Y2 is made of a plastic material such as PET (polyethyleneterephthalate) and is formed by plastic molding. In other words, the container head portion 32Y2 is formed by resin-molding. This is because the container head portion 33Y2 is preferably united with, for example, the gear 33*c* that requires a relatively large mechanical strength, and such a condition is unlikely to be achieved with forming paper. On the other hand, the container bottom portion 33Y3 is united with the grip 33*d*. However, the container bottom portion 33Y3 does not require as much mechanical strength as the container head portion 33Y2. Accordingly, the container bottom portion 33Y3 may be formed by resin-molding or by press working of forming paper. In other words, the container bottom portion 33Y3 may be formed by resin-molding or by press working of paper. In particular, when the grip 33*d* has a simple concave-and-convex shape, the grip 33*d* is preferably formed with press-workable forming paper in order to reduce the amount of resin.

As described above, in the toner container 32Y in the present embodiment, at least the container main portion 33Y1 in the container body 33Y is formed of press-workable forming paper (paper) instead of resin material. Thus, the amount of resin used is reduced. Such a configuration can reduce the environmental load and the cost of the toner container 32Y. The toner container 32Y in the present embodiment is formed of press-workable paper, the following effects are also exhibited as compared with a toner container formed by, for example, injection molding, blow molding, or folding: 1) the strength of paper itself is increased, 2) the surface property of paper itself is enhanced, and 3) paper dust is less likely to be generated even with the material as it is or even after the surface is coated (e.g., an abnormal image is less likely to be generated due to the paper dust mixed with toner). In the present embodiment, the toner container 32Y (the container main portion 33Y1) is formed of the forming paper as the press-workable paper. However, the toner container 32Y (the container main portion 33Y1) may be formed of thick paper as the press-workable paper.

With reference to FIGS. 9A to 9D (and FIG. 7), in the present embodiment, the container main portion 33Y1 is formed such that, after a first semi-cylindrical portion 33Y11 and a second semi-cylindrical portion 33Y12 coupled at a bent portion 33Y10 are formed by press working, the first semi-cylindrical portion 33Y11 and the second semi-cylindrical portion 33Y12 are bent at the bent portion 33Y10 to join the end B1 of the first semi-cylindrical portion 33Y11 and the end B2 of the second semi-cylindrical portion 33Y12 together into a substantially cylindrical shape. In the present embodiment, the first semi-cylindrical portion 33Y11 and the second semi-cylindrical portion 33Y12 are obtained by equally dividing a cylinder into two portions. The press working (pressing step) is performed using an upper die 200A and a lower die 200B so that the concave-and-convex portions 33*b*1 are formed on the first semi-cylindrical portion 33Y11 and the concave-and-convex portions 33*b*2 are formed on the second semi-cylindrical portion 33Y12.

Figure 9A:
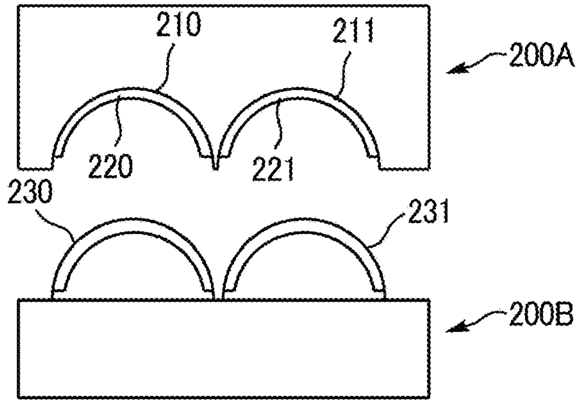
FIGS. 9A to 9D are diagrams illustrating a step of manufacturing a substantially cylindrical container main portion.
Figure 9B:
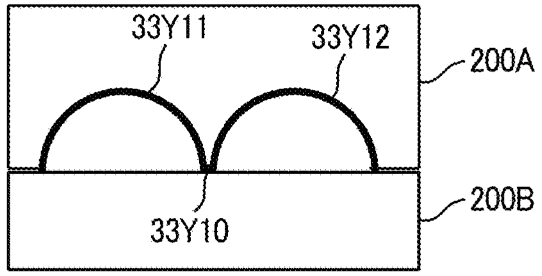
Figure 9C:
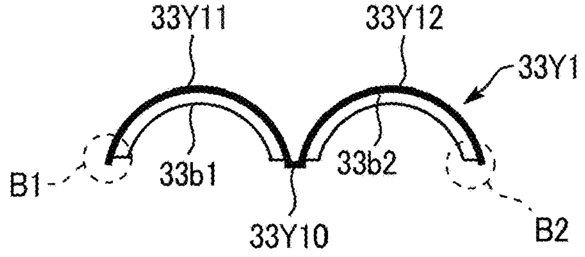
Figure 9D:
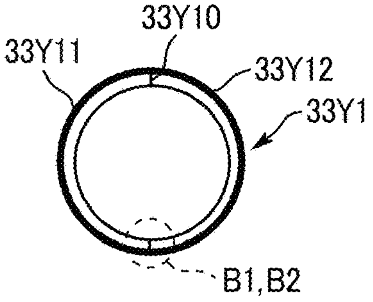

Accordingly, in the method for manufacturing the container main portion 33Y1 described above, the "pressing step" is a step in which the first semi-cylindrical portion 33Y11 and the second semi-cylindrical portion 33Y12 coupled at the bent portion 33Y10 with respect to a flat sheet of forming paper (paper) are formed, and the plurality of concave-and-convex portions 33*b*1 and the plurality of concave-and-convex portions 33*b*2 are formed on the first semi-cylindrical portion 33Y11 and the second semi-cylindrical portion 33Y12, respectively, with reference to FIGS. 9A and 9B. With reference to FIGS. 9C and 9D, the "joining step" is a step of joining the end B1 of the first semi-cylindrical portion 33Y11 and the end B2 of the second semi-cylindrical portion 33Y12 together by bending the flat sheet of forming paper at the bent portion 33Y10. The above-described "pressing step" can be divided into a "semi-cylindrical portion forming step" in which the first semi-cylindrical portion 33Y11 and the second semi-cylindrical portion 33Y12 coupled to each other at the bent portion 33Y10 with respect to a flat sheet of forming paper (paper) are formed, and a "concave-and-convex portion forming step" in which the concave-and-convex portions **33*b*1 and 33*b*2** are formed before and after the "semi-cylindrical portion forming step." In other words, the "semi-cylindrical portion forming step" and the "concave-and-convex portion forming step" can be performed simultaneously or at different timings.

A description is given of a process of manufacturing the container main portion 33Y1 in more detail with reference to FIGS. 9A to 9D. First, as illustrated in FIG. 9A, a flat sheet of forming paper is set between the upper die 200A and the lower die 200B separated from each other. The upper die 200A and the lower die 200B have concave portions 210 and 211 and convex portions 230 and 231 for forming the first semi-cylindrical portion 33Y11 and the second semi-cylindrical portion 33Y12, respectively, and have peak portions 220 and 221 and valley portions for forming the plurality of concave-and-convex portions **33*b*1 and 33*b*2. As illustrated in FIG. 9B, the upper die 200A and the lower die 200B are fitted in a state where a flat sheet of forming paper is set, so that press working is performed on the forming paper. Accordingly, the plurality of concave-and-convex portions 33*b*1 and the plurality of concave-and-convex portions 33*b*2 are formed on the first semi-cylindrical portion 33Y11 and the second semi-cylindrical portion 33Y12, respectively. Thus, the first semi-cylindrical portion 33Y11 and the second semi-cylindrical portion 33Y12 coupled at the bent portion 33Y10 (see FIG. 9C) are taken out from the upper die 200A and the lower die 200B. The container main portion 33Y1 (forming paper) after press working illustrated in FIG. 9C is bent at the bent portion 33Y10 as illustrated in FIG. 9D, and the end B1 of the first semi-cylindrical portion 33Y11 and the end B2 of the second semi-cylindrical portion 33Y12 are joined with an adhesive. Thus, the manufacturing of the substantially cylindrical container main portion 33Y1** is completed.

The first semi-cylindrical portion 33Y11 and the second semi-cylindrical portion 33Y12 are formed by press working in this way, so that the workability of the step of forming the substantially cylindrical container main portion 33Y1 (joining step) is enhanced as compared with the case of forming a cylinder by rolling a flat sheet of forming paper. Moreover, the plurality of concave-and-convex portions **33*b*1 and 33*b*2 are also formed simultaneously in the process of forming the first semi-cylindrical portion 33Y11 and the second semi-cylindrical portion 33Y12** by press working, and thus the number of overall processes does not increase and the production efficiency can be increased.

With reference to FIG. 7, the container main portion 33Y1 in the present embodiment is formed such that, in a state of a flat sheet of forming paper before press working (a state developed into a flat shape), both the plurality of concave-and-convex portions **33*b*1 formed on the first semi-cylindrical portion 33Y11 and the plurality of concave-and-convex portions 33*b*2 formed on the second semi-cylindrical portion 33Y12 extend in a direction inclined at a specified angle α (within ±85°) with respect to the bent portion 33Y10 extending in the rotation axis direction (the left-and-right direction in FIG. 7). In the substantially cylindrical container main portion 33Y1 (i.e., the container main portion 33Y1 after completion of manufacture), a virtual line connecting the plurality of concave-and-convex portions 33*b*1 formed on the first semi-cylindrical portion 33Y11 and the plurality of concave-and-convex portions 33*b*2 formed on the second semi-cylindrical portion 33Y12 is formed to draw one spiral (one spiral connected alternately up and down from one end in the order of the concave-and-convex portion 33*b*1 on the rightmost lower side, the concave-and-convex portion 33*b*2 on the rightmost upper side, the concave-and-convex portion 33*b*1 on the second lower right side, and the concave-and-convex portion 33*b*2 on the second upper right side). Specifically, the plurality of concave-and-convex portions 33*b*1 and 33*b*2 are formed to have the same lengths M in a spiral direction (the direction of the inclined angle α), the same intervals (pitches) H in the direction orthogonal to the spiral direction, and the same intervals N in the spiral direction at the position straddling the bent portion 33Y10 (and the position straddling the ends B1 and B2). The plurality of concave-and-convex portions 33*b*1 and 33*b*2 are not formed at the position of the bent portion 33Y10, so that the bending operation at the bent portion 33Y10 in the joining step described above can be easily performed. A concave-and-convex portion is not formed at the positions of the ends B1 and B2, so that the joining operation of the ends B1 and B2** in the joining step described above can be easily performed.

First Modification

Figure 10:
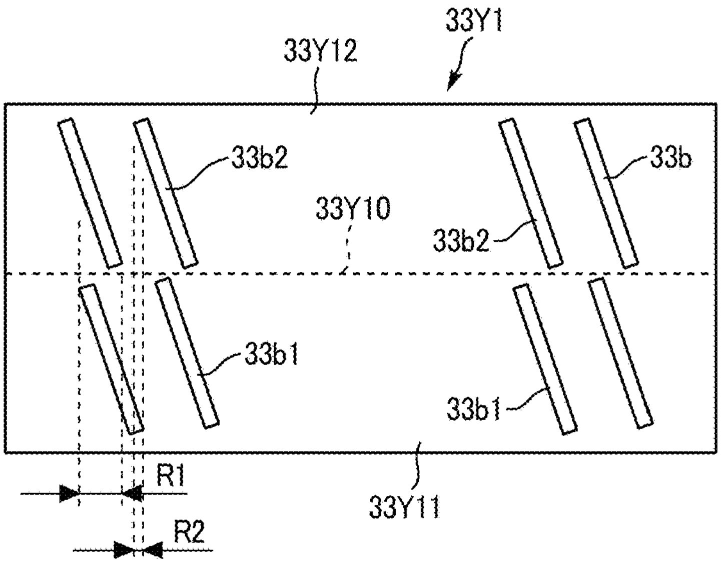
FIG. 10 is a plan view of a flat sheet of forming paper before formation of a substantially cylindrical container main portion, according to a first modification.

As illustrated in FIG. 10, a container main portion 33Y1 of the toner container 32Y (container body 33Y) in the first modification is formed such that the concave-and-convex portion **33*b*2 of the second semi-cylindrical portion 33Y12 is shifted in phase in the rotation axis direction (left-and-right direction in FIG. 10) with respect to the concave-and-convex portion 33*b*1 of the first semi-cylindrical portion 33Y11. Specifically, in the first modification, the substantially cylindrical container main portion 33Y1 (container main portion 33Y1 after completion of manufacturing) is disposed such that a virtual line connecting a plurality of concave-and-convex portions 33*b*1 formed on the first semi-cylindrical portion 33Y11 draws one spiral (a first spiral), and is formed such that a virtual line connecting a plurality of concave-and-convex portions 33*b*2 formed on the second semi-cylindrical portion 33Y12 draws one spiral (a second spiral) shifted in the rotation axis direction with respect to the above-described one spiral (the first spiral). In other words, a double spiral is formed on the container main portion 33Y1 (container body 33Y). Even in such a configuration, the container main portion 33Y1 (container body 33Y) is rotated so that toner in the toner container 32Y is conveyed in the rotation axis direction by the plurality of concave-and-convex portions 33*b*1 and 33*b*2. As illustrated in FIG. 10, in a state of a flat sheet of forming paper before press working is performed (a state developed in a flat shape), the container main portion 33Y1 is disposed such that one area, closer to the bent portion 33Y10, of one concave-and-convex portion 33*b*1 formed on the first semi-cylindrical portion 33Y11 and one area, closer to the bent portion 33Y10, of one concave-and-convex portion 33*b*2 formed on the second semi-cylindrical portion 33Y12 overlap each other by a distance R1 when viewed in the direction orthogonal to the rotation axis direction. Such a configuration can enhance toner conveyance property between the concave-and-convex portion 33*b*1 on the first semi-cylindrical portion 33Y11 and the concave-and-convex portion 33*b*2 on the second semi-cylindrical portion 33Y12 at the position corresponding to the bent portion 33Y10 when the container main portion 33Y1 (container body 33Y) rotates. Thus, the overall toner conveyance property is enhanced. As illustrated in FIG. 10, in the state of a flat sheet of forming paper before press working is performed (a state developed in a flat shape), the container main portion 33Y1 is disposed such that one area (closer to the end B1), farther from the bent portion 33Y10, of one concave-and-convex portion 33*b*1 formed on the first semi-cylindrical portion 33Y11 and one area (close to the end B2), farther from to the bent portion 33Y10, of one concave-and-convex portion 33*b*2 formed on the second semi-cylindrical portion 33Y12 overlap each other by a distance R2 when viewed in the direction orthogonal to the rotation axis direction. Such a configuration can enhance toner conveyance property between the concave-and-convex portion 33*b*1 on the first semi-cylindrical portion 33Y11 and the concave-and-convex portion 33*b*2 on the second semi-cylindrical portion 33Y12 at the position corresponding to the ends B1 and B2 when the container main portion 33Y1 (container body 33**Y) rotates. Thus, the overall toner conveyance property is enhanced.

Second Modification

Figure 11:
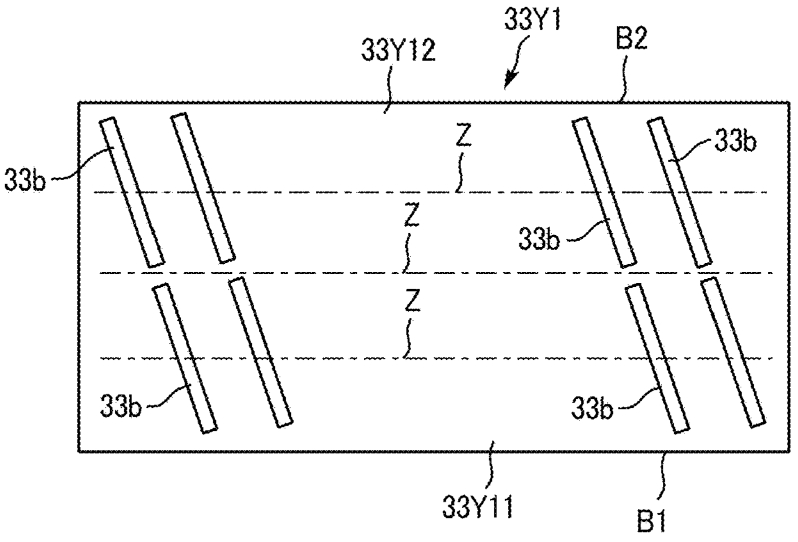
FIG. 11 is a plan view of a flat sheet of forming paper on which press working is performed, according to a second modification.
Figure 12A:
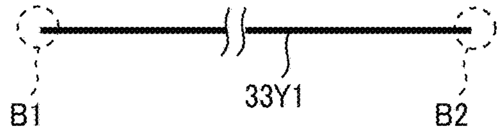
FIGS. 12A and 12B are diagrams illustrating a step of manufacturing a substantially cylindrical container main portion after the press working of FIG. 11.
Figure 12B:
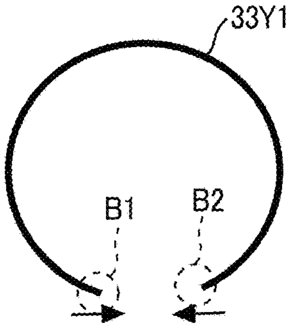

As illustrated in FIG. 11, a plurality of cuts Z parallel to the rotation axis direction are formed in the container main portion 33Y1 of the toner container 32Y (container body 33Y) in the second modification. The cuts Z are formed by cutting the container main portion 33Y1 from the outer circumferential surface (front surface 33Ya) so that the cuts Z do not reach the inner circumferential surface (back surface 33Yb). In the second modification, the first semi-cylindrical portion 33Y11 and the second semi-cylindrical portion 33Y12 are not formed in the pressing step (in the press-working step) as illustrated in FIGS. 9A to 9D. However, a plurality of concave-and-convex portions **33*b* are formed on the flat sheet of forming paper (container main portion 33Y1) illustrated in FIG. 12A. As illustrated in FIG. 12B, the ends B1 and B2 of the flat sheet of forming paper after press working are joined with each other to form the cylindrical container main portion 33Y1. At this time, the plurality of cuts Z parallel to the rotation axis direction are formed in the container main portion 33Y1, and thus, the operation of rolling the flat sheet of forming paper into a cylindrical shape in the joining step is easily performed. Even when the flat sheet of forming paper is rolled into a cylindrical shape in the joining step without forming the semi-cylindrical portions 33Y11 and 33Y12 in the pressing step, the upper concave-and-convex portion 33*b*1 and the lower concave-and-convex portion 33*b*2 can be formed to be shifted in the rotation axis direction as illustrated in FIG. 10** in the pressing of the flat sheet of the forming paper.

As described above, the toner container 32Y in the present embodiment is a powder container that can store powder therein, and includes the substantially cylindrical container main portion 33Y1 that rotates around the rotation axis R to convey toner (powder) stored therein in the conveyance direction along the rotation axis direction. The container main portion 33Y1 is formed by press working of forming paper (paper). Such a configuration can reduce the amount of resin used for the toner container 32Y.

In the present embodiment, only toner is stored in the toner container 32Y (powder container). However, in some embodiments, toner containers may contain two-component developer as powder including toner and carrier to be used in an image forming apparatus in which the two-component developer is appropriately supplied to developing devices. In other words, as the powder container, the toner container 32Y in which toner is stored can be used, and a developer container in which developer is stored can be used. In the present embodiment, the present disclosure is applied to the toner container 32Y that includes the container body 33Y and the cap 34Y, but the toner container (powder container) to which the present disclosure is applied is not limited to this. The present disclosure can be applied to, for example, a powder container that includes only a container body (e.g., a toner container that directly ejects toner from an ejection port of a container head portion toward the outside of the container), or a toner container that includes a cap having a toner ejection port at a lateral end surface instead of a bottom portion. In the present embodiment, the present disclosure is applied to the toner container 32Y as the powder container installed in the image forming apparatus 100, but the powder container to which the present disclosure is applied is not limited to this. For example, the present disclosure can be also applied to a powder container in which edible powder such as flour or potato starch is stored therein. Even in such a case, effects equivalent to those of the above-described embodiments can be obtained.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

Aspects of the present disclosure may be, for example, a combination of the following first to twenty-second aspects.

First Aspect

A powder container (e.g., the toner container 32Y) for storing powder inside includes a container main portion (e.g., the container main portion 33Y1). The container main portion has a substantially cylindrical shape to rotate around a rotation axis of the container main portion to convey powder stored inside the container main portion in a conveyance direction along a direction of the rotation axis. The container main portion is made of paper formed by press working.

Second Aspect

The powder container (e.g., the toner container 32Y) according to the first aspect further includes a container head portion (e.g., the container head portion 33Y2). The container head portion is disposed to communicate with an opening of the container main portion (e.g., the container main portion 33Y1) on a downstream side of the container main portion in the conveyance direction. The container head portion includes an ejection port to eject the powder conveyed from the container main portion to an outside of the powder container and a gear (e.g., the gear **33*c***) formed on an outer circumferential surface of the container head portion. The container head portion is rotatable together with the container main portion and is made by resin molding.

Third Aspect

The powder container (e.g., the toner container 32Y) according to the first or second aspect includes a container bottom portion (e.g., the container bottom portion 33Y3). The container bottom portion is to close an opening of the container main portion (e.g., the container main portion 33Y1) on an upstream side of the container main portion in the conveyance direction. The container bottom portion is rotatable together with the container main portion and is made by resin molding or by press working of paper.

Fourth Aspect

In the powder container (e.g., the toner container 32Y) according to any one of the first to third aspects, the container main portion (e.g., the container main portion 33Y1) has a plurality of concave-and-convex portions (e.g., the concave-and-convex portions 33*b*) formed by press working. The plurality of concave-and-convex portions are recessed from an outer circumferential surface of the substantially cylindrical shape and protrude toward an inner circumferential surface.

Fifth Aspect

In the powder container (e.g., the toner container 32Y) according to the fourth aspect, the plurality of concave-and-convex portions (e.g., the concave-and-convex portions 33*b*) are spirally arranged in the container main portion (e.g., the container main portion 33Y1) having the substantially cylindrical shape.

Sixth Aspect

In the powder container (e.g., the toner container 32Y) according to the fifth aspect, each of the plurality of concave-and-convex portions (e.g., the concave-and-convex portions 33*b*) is a spiral of a half of the circumference or less in the container main portion (e.g., the container main portion 33Y1).

Seventh Aspect

In the powder container (e.g., the toner container 32Y) according to any one of the first to sixth aspects, the container main portion (e.g., the container main portion 33Y1) is formed such that a first semi-cylindrical portion (e.g., the first semi-cylindrical portion 33Y11) and a second semi-cylindrical portion (e.g., the second semi-cylindrical portion 33Y12) coupled at a bent portion (e.g., the bent portion 33Y10) are formed by press working and bent at the bent portion to join an end (e.g., the end B1) of the first semi-cylindrical portion and an end (e.g., the end B2) of the second semi-cylindrical portion together into the substantially cylindrical shape.

Eighth Aspect

In the powder container (e.g., the toner container 32Y) according to the seventh aspect, the plurality of concave-and-convex portions (e.g., the concave-and-convex portions 33*b*) are formed on each of the first semi-cylindrical portion (e.g., the first semi-cylindrical portion 33Y11) and the second semi-cylindrical portion (e.g., the second semi-cylindrical portion 33Y12).

Ninth Aspect

In the powder container (e.g., the toner container 32Y) according to the eighth aspect, in a state of a flat sheet of paper before the press working, the container main portion (e.g., the container main portion 33Y1) is formed such that both the plurality of concave-and-convex portions (e.g., the concave-and-convex portions 33*b*) formed on the first semi-cylindrical portion (e.g., the first semi-cylindrical portion 33Y11) and the plurality of concave-and-convex portions (e.g., the concave-and-convex portions 33*b*) formed on the second semi-cylindrical portion (e.g., the second semi-cylindrical portion 33Y12) extend in a direction inclined at a specified angle with respect to the bent portion (e.g., the bent portion 33Y10) extending in the direction of the rotation axis.

Tenth Aspect

In the powder container (e.g., the toner container 32Y) according to the ninth aspect, the container main portion (e.g., the container main portion 33Y1) having the substantially cylindrical shape is formed such that an imaginary line connecting the plurality of concave-and-convex portions (e.g., the concave-and-convex portions 33*b*) formed on the first semi-cylindrical portion (e.g., the first semi-cylindrical portion 33Y11) and the plurality of concave-and-convex portions formed on the second semi-cylindrical portion (e.g., the second semi-cylindrical portion 33Y12) draws one spiral.

Eleventh Aspect

In the powder container (e.g., the toner container 32Y) according to the ninth aspect, the container main portion (e.g., the container main portion 33Y1) having the substantially cylindrical shape is formed such that an imaginary line connecting the plurality of concave-and-convex portions (e.g., the concave-and-convex portions 33*b*) formed on the first semi-cylindrical portion (e.g., the first semi-cylindrical portion 33Y11) draws one spiral, and an imaginary line connecting the plurality of concave-and-convex portions formed on the second semi-cylindrical portion (e.g., the second semi-cylindrical portion 33Y12) draws another spiral shifted in the direction of the rotation axis with respect to the one spiral.

Twelfth Aspect

In the powder container (e.g., the toner container 32Y) according to any one of the eighth to eleventh aspects, in the state of the flat sheet of forming paper before the press working, the container main portion (e.g., the container main portion 33Y1) is formed such that one area, closer to the bent portion (e.g., the bent portion 33Y10), of one of the plurality of concave-and-convex portions (e.g., the concave-and-convex portion 33*b*1) formed on the first semi-cylindrical portion (e.g., the first semi-cylindrical portion 33Y11) and one area, closer to the bent portion, of one of the plurality of concave-and-convex portions formed on the second semi-cylindrical portion (e.g., the second semi-cylindrical portion 33Y12) overlap each other when viewed in the direction orthogonal to the direction of the rotation axis.

Thirteenth Aspect

In the powder container (e.g., the toner container 32Y) according to the twelfth aspect, in the state of the flat sheet of forming paper before the press working, the container main portion (e.g., the container main portion 33Y1) is formed such that one area, farther from the bent portion (e.g., the bent portion 33Y10), of one of the plurality of concave-and-convex portions (e.g., the concave-and-convex portion 33*b*1) formed on the first semi-cylindrical portion (e.g., the first semi-cylindrical portion 33Y11) and one area, farther from the bent portion, of one of the plurality of concave-and-convex portions formed on the second semi-cylindrical portion (e.g., the second semi-cylindrical portion 33Y12) overlap each other when viewed in the direction orthogonal to the rotation axis direction.

Fourteenth Aspect

In the powder container (e.g., the toner container 32Y) according to the ninth aspect, in the state of the flat sheet of forming paper before the press working, the container main portion (e.g., the container main portion 33Y1) is formed such that one area, farther from the bent portion (e.g., the bent portion 33Y10), of one of the plurality of concave-and-convex portions (e.g., the concave-and-convex portion 33*b*1) formed on the first semi-cylindrical portion (e.g., the first semi-cylindrical portion 33Y11) and one area, farther from the bent portion, of one of the plurality of concave-and-convex portions formed on the second semi-cylindrical portion (e.g., the second semi-cylindrical portion 33Y12) overlap each other when viewed in the direction orthogonal to the direction of the rotation axis.

Fifteenth Aspect

In the powder container (e.g., the toner container 32Y) according to any one of the first to fourteenth aspects, the container main portion (e.g., the container main portion 33Y1) has a plurality of cuts (e.g., the cut Z) parallel to the direction of the rotation axis.

Sixteenth Aspect

In the powder container (e.g., the toner container 32Y) according to any one of the first to fifteenth aspects, the paper is forming paper.

Seventeenth Aspect

In the powder container (e.g., the toner container 32Y) according to any one of the first to fifteenth aspects, the paper is thick paper.

Eighteenth Aspect

In the powder container (e.g., the toner container 32Y) according to any one of the first to seventeenth aspects, the powder container is a toner container or a developer container.

Nineteenth Aspect

An image forming apparatus (e.g., the image forming apparatus 100) includes a body and the powder container (e.g., the toner container 32Y) according to any one of the first to eighteenth aspects detachably attached to the body.

Twentieth Aspect

A method of manufacturing a powder container (e.g., the toner container 32Y) for storing powder inside includes performing press working on a flat sheet of paper to form a plurality of concave-and-convex portions (e.g., the concave-and-convex portions 33*b*) that are recessed from a front surface of the flat sheet of paper and protrude toward a back surface of the flat sheet of paper and joining ends (e.g., the end B1, B2) of the flat sheet of paper to form a container main portion (e.g., the container main portion 33Y1) having a substantially cylindrical shape after the pressing working.

Twenty-First Aspect

The method for manufacturing the powder container (e.g., the toner container 32Y) according to the twentieth aspect, the performing the press working includes forming a first semi-cylindrical portion (e.g., the first semi-cylindrical portion 33Y11) and a second semi-cylindrical portion (e.g., the second semi-cylindrical portion 33Y12) connected to each other at a bent portion on the flat sheet of paper and forming a plurality of concave-and-convex portions (e.g., the concave-and-convex portions 33*b*) on the first semi-cylindrical portion and the second semi-cylindrical portion. The joining includes bending the first semi-cylindrical portion and the second semi-cylindrical portion at the bent portion (e.g., the bent portion 33Y10) to join an end (e.g., the end B1) of the first semi-cylindrical portion and an end (e.g., the end B2) of the second semi-cylindrical portion to each other.

Twenty-Second Aspect

The method of manufacturing a powder container (e.g., the toner container 32Y) according to the twenty-second aspect, the performing the press working includes forming the first semi-cylindrical portion (e.g., the first semi-cylindrical portion 33Y11) and the second semi-cylindrical portion (e.g., the second semi-cylindrical portion 33Y12) connected to each other at the bent portion (e.g., the bent portion 33Y10) on the flat sheet of paper and forming the plurality of concave-and-convex portions (e.g., the concave-and-convex portions 33*b*) before and after the forming of the first semi-cylindrical-portion forming and the second semi-cylindrical-portion forming are performed.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A powder container for storing powder inside, comprising:

a container main portion having a substantially cylindrical shape to rotate around a rotation axis of the container main portion to convey powder stored inside the container main portion in a conveyance direction along a direction of the rotation axis, the container main portion being a component including paper formed by press working; and a container head portion disposed to communicate with an opening of the container main portion on a downstream side of the container main portion in the conveyance direction, wherein the container head portion includes:

an ejection port to eject the powder conveyed from the container main portion to an outside of the powder container; and a gear formed on an outer circumferential surface of the container head portion, and the container head portion is rotatable together with the container main portion and is a component made by resin molding.

2. The powder container according to claim 1, wherein; the container main portion has a plurality of concave-and-convex portions formed by press working, and the plurality of concave-and-convex portions are recessed from an outer circumferential surface of the substantially cylindrical shape and protrude toward an inner circumferential surface.

3. The powder container according to claim 2, wherein; the plurality of concave-and-convex portions are spirally arranged in the container main portion having the substantially cylindrical shape.

4. The powder container according to claim 3, wherein: each of the plurality of concave-and-convex portions is a spiral of a half of the circumference or less in the container main portion.

5. The powder container according to claim 2, wherein: the container main portion is formed such that a first semi-cylindrical portion and a second semi-cylindrical portion coupled at a bent portion are formed by press working and bent at the bent portion to join an end of the first semi-cylindrical portion and an end of the second semi-cylindrical portion together into the substantially cylindrical shape.

6. The powder container according to claim 5, wherein; the plurality of concave-and-convex portions are formed on each of the first semi-cylindrical portion and the second semi-cylindrical portion.

7. The powder container according to claim 6, wherein: in a state of a flat sheet of paper before the press working, the container main portion is formed such that both the plurality of concave-and-convex portions formed on the first semi-cylindrical portion and the plurality of concave-and-convex portions formed on the second semi-cylindrical portion extend in a direction inclined at a specified angle with respect to the bent portion extending in the direction of the rotation axis.

8. The powder container according to claim 7, wherein; the container main portion having the substantially cylindrical shape is formed such that an imaginary line connecting the plurality of concave-and-convex portions formed on the first semi-cylindrical portion and the plurality of concave-and-convex portions formed on the second semi-cylindrical portion draws one spiral.

9. The powder container according to claim 7, wherein; the container main portion having the substantially cylindrical shape is formed such that an imaginary line connecting the plurality of concave-and-convex portions formed on the first semi-cylindrical portion draws one spiral, and an imaginary line connecting the plurality of concave-and-convex portions formed on the second semi-cylindrical portion draws another spiral shifted in the direction of the rotation axis with respect to the one spiral.

10. The powder container according to claim 7, wherein: in the state of the flat sheet of forming paper before the press working, the container main portion is formed such that one area, closer to the bent portion, of one of the plurality of concave-and-convex portions formed on the first semi-cylindrical portion and one area, closer to the bent portion, of one of the plurality of concave-and-convex portions formed on the second semi-cylindrical portion overlap each other when viewed in the direction orthogonal to the direction of the rotation axis.

11. The powder container according to claim 10, wherein: in the state of the flat sheet of forming paper before the press working, the container main portion is formed such that one area, farther from the bent portion, of one of the plurality of concave-and-convex portions formed on the first semi-cylindrical portion and one area, farther from the bent portion, of one of the plurality of concave-and-convex portions formed on the second semi-cylindrical portion overlap each other when viewed in the direction orthogonal to the rotation axis direction.

12. The powder container according to claim 7, wherein: in the state of the flat sheet of forming paper before the press working, the container main portion is formed such that one area, farther from the bent portion, of one of the plurality of concave-and-convex portions formed on the first semi-cylindrical portion and one area, farther from the bent portion, of one of the plurality of concave-and-convex portions formed on the second semi-cylindrical portion overlap each other when viewed in the direction orthogonal to the direction of the rotation axis.

13. The powder container according to claim 1, wherein; the container main portion has a plurality of cuts parallel to the direction of the rotation axis.

14. The powder container according to claim 1, wherein; the powder container is a toner container or a developer container.

15. An image forming apparatus comprising:
a body; and
the powder container according to claim 1 detachably attached to the body.

16. A powder container comprising:
a container main portion having a substantially cylindrical shape to rotate around a rotation axis of the container main portion to convey powder stored inside the container main portion in a conveyance direction along a direction of the rotation axis, the container main portion being a component including paper formed by press working; and
a container bottom portion disposed to close an opening of the container main portion on an upstream side of the container main portion in the conveyance direction,
wherein the container bottom portion is rotatable together with the container main portion and is a component made by resin molding or by press working of paper.

17. The powder container according to claim 16, wherein: the container main portion has a plurality of concave-and-convex portions formed by press working, and the plurality of concave-and-convex portions are recessed from an outer circumferential surface of the substantially cylindrical shape and protrude toward an inner circumferential surface.

18. The powder container according to claim 17, wherein: the plurality of concave-and-convex portions are spirally arranged in the container main portion having the substantially cylindrical shape.

19. A method of manufacturing a powder container for storing powder inside, the method comprising:
performing press working on a flat sheet of paper to form a plurality of concave-and-convex portions that are recessed from a front surface of the flat sheet of paper and protrude toward a back surface of the flat sheet of paper; and
joining ends of the flat sheet of paper to form a container main portion having a substantially cylindrical shape after the press working, wherein the performing the press working includes:

forming a first semi-cylindrical portion and a second semi-cylindrical portion connected to each other at a bent portion on the flat sheet of paper; and forming a plurality of concave-and-convex portions on the first semi-cylindrical portion and the second semi-cylindrical portion, and wherein the joining includes bending the first semi-cylindrical portion and the second semi-cylindrical portion at the bent portion to join an end of the first semi-cylindrical portion and an end of the second semi-cylindrical portion to each other.

20. The method according to claim 19, wherein the performing the press working includes:

forming the first semi-cylindrical portion and the second semi-cylindrical portion connected to each other at the bent portion on the flat sheet of paper; and forming the plurality of concave-and-convex portions before and after the forming of the first semi-cylindrical-portion forming and the second semi-cylindrical-portion forming are performed.

* * * * *